United States Patent
Nakajima

[11] Patent Number: 6,069,659
[45] Date of Patent: May 30, 2000

[54] STROBE DEVICE THAT PREVENTS THE FLICKER OF FLASHLIGHT AND FLASHING METHOD THEREOF

[75] Inventor: Yukio Nakajima, Kanagawa-ken, Japan

[73] Assignee: Olympus Optical Co., Ltd., Tokyo, Japan

[21] Appl. No.: 08/867,895

[22] Filed: Jun. 3, 1997

[51] Int. Cl.[7] .................................................. H04N 5/222
[52] U.S. Cl. ........................................... 348/371; 348/362
[58] Field of Search .................................... 348/220, 221, 348/226, 227, 231, 239, 362, 364, 366, 370, 371, 223, 224; H04N 5/222

[56] References Cited

U.S. PATENT DOCUMENTS

| | | | |
|---|---|---|---|
| 5,486,861 | 1/1996 | Miyamoto et al. | 348/362 |
| 5,568,194 | 10/1996 | Abe | 348/223 |
| 5,808,681 | 9/1998 | Kitajima | 348/371 |

*Primary Examiner*—Tuan Ho
*Attorney, Agent, or Firm*—Frishauf, Holtz, Goodman, Langer & Chick, P.C.

[57] ABSTRACT

A strobe device and its flashing method for use with an electronic camera of the present invention are such that a preliminary flashlight to set the amount of light of the main flashing is received by a CCD 1, the amount of light of the main flashing is set on the basis of the signal from the CCD 1, the time interval between the preliminary flashing and the main flashing is set to a time that prevents the photographer from recognizing fluctuations in the luminance, and when the interval has exceeded the time, more than one flashing that has nothing to do with the setting of the amount of light of the main flashing is done between the preliminary flashing and the main flashing, thereby preventing the flicker of flashing that gives a sense of incongruity to the photographer.

14 Claims, 4 Drawing Sheets

STROBE DEVICE THAT PREVENTS THE FLICKER OF FLASHLIGHT AND FLASHING METHOD THEREOF

BACKGROUND OF THE INVENTION

The present invention relates to an electronic still camera having an imaging device, such as a CCD, and a strobe device acting as supplementary light means, and more particularly to a strobe device that provides high-accuracy control without using a dedicated strobe flashing control circuit.

When natural light alone is insufficient in the amount of light in taking a picture with an imaging device, such as a camera, supplementary light is used to compensate for the light shortage. To do this, a strobe device is used, for example. To optimize the amount of flashlight in taking a picture, the strobe device flashes preliminarily beforehand and sets the amount of light of the main flashing for actual exposure.

To control the amount of light of the main flashing as described above, a control circuit including a special light-receiving element for controlling the amount of flashlight is provided in a strobe device, as disclosed in, for example, Jpn. Pat. Appln. KOKAI Publication No. 3-126383.

The technique disclosed in the publication, however, requires an additional control circuit including a special light-receiving element for controlling the amount of flashlight in the strobe device, raising the manufacturing cost of the camera.

In addition, Jpn. Pat. Appln. KOKOKU Publication No. 5-44654 has disclosed an electronic camera system that uses an imaging element to set the amount of light of the main flashing on the basis of the integrated output, without using a special light-receiving element or a special control circuit.

The device disclosed in the publication needs no special circuit for controlling the amount of flashlight in the strobe device. When there is an interval between the preliminary flashing to set the amount of light of the main flashing and the main flashing, the photographer gets the impression that the main flashing is different from the flashing for exposure and therefore has a sense of incongruity. Particularly in remote-control photographing, the subject or subjects, one of whom remote-controls the camera, may mistake the preliminary flashing for the main flashing and may think that the photographing has just been completed and move before the main flashing is performed. In this case, the photograph obtained will be a blurred one.

BRIEF SUMMARY OF THE INVENTION

The object of the present invention is to provide a strobe device that prevents the flickering of preliminary flashlight and enables high-accuracy control of the amount of flashlight without using a dedicated control circuit including a light-receiving element for controlling the amount of flashlight.

The foregoing object is accomplished by providing a strobe device comprising: preliminary flash projecting means for preliminarily flashing to set the amount of light of the main flashing, by projecting supplementary flashlight on a subject for photography; a two-dimensional imaging element for photoelectrically converting the image information on the subject produced by the preliminary flashing; amount-of-flashlight computing means for calculating the amount of light of the main flashing projected on the subject from the output of the two-dimensional imaging element; flashing control means for setting the amount of light of the main flashing on the basis of the calculation result produced by the amount-of-light computing means; and means for setting the interval between the preliminary flashing and the main flashing at such a time as prevents the naked eye from recognizing fluctuations in the luminance existing between the preliminary flashing and the main flashing.

Furthermore, when the time interval between the preliminary flashing and the main flashing has exceeded the time that prevents the naked eye from recognizing fluctuations in the luminance, the preliminary flash projecting means effects flashing once or more times that has nothing to do with the setting of the amount of light of the main flashing, during the interval between the preliminary flashing and the main flashing to force the setting time to lie in the time interval that prevents the naked eye from recognizing fluctuations in the luminance.

The foregoing object is accomplished by providing a strobe device comprising: preliminary flash projecting means for preliminarily flashing to set the amount of light of the main flashing, by projecting supplementary flashlight on a subject for photography; a two-dimensional imaging element for photoelectrically converting the image information on the subject produced by the preliminary flashing; amount-of-flashlight computing means for calculating the amount of light of the main flashing to be projected on the subject on the basis of the difference between a first output produced by the two-dimensional imaging element with preliminary flashing and a second output close to the first output produced by the two-dimensional imaging element without preliminary flashing; and flashing control means for setting the amount of light of the main flashing on the basis of the calculation result from the amount-of-light computing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained in detail.

Figure 1:
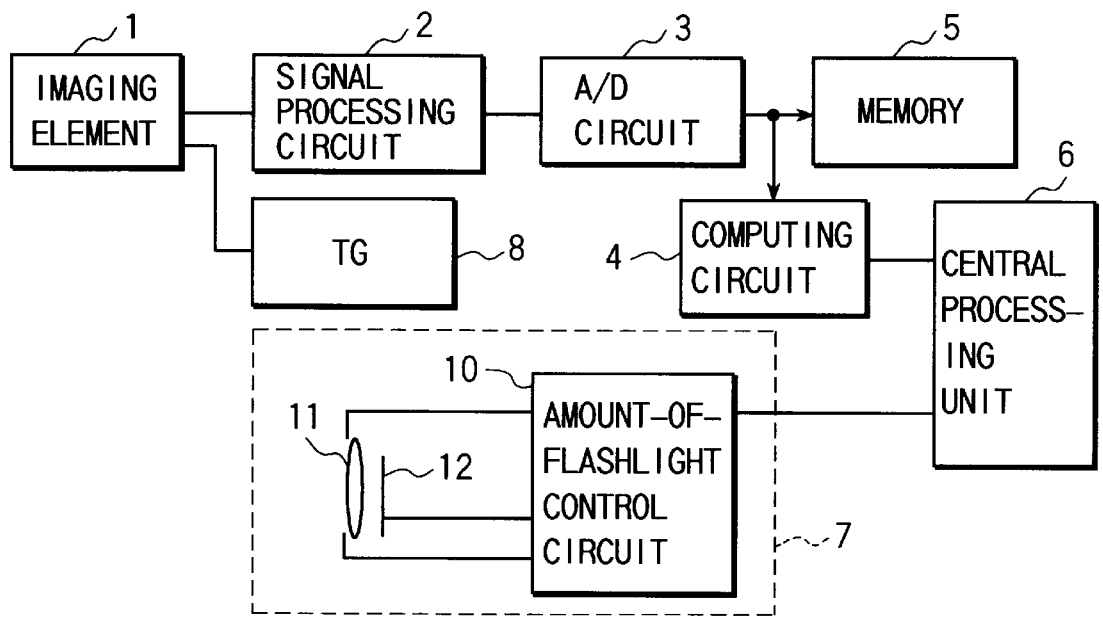
FIG. 1 shows a schematic configuration of a strobe device applied to an electronic camera according to a first embodiment of the present invention.

FIG. 1 shows a schematic configuration of a strobe device applied to an electronic camera according to a first embodiment of the present invention.

In the first embodiment, the strobe device of the first embodiment comprises: an imaging element for taking a picture of a subject, such as a CCD 1; a signal processing circuit 2 for amplifying, sampling, and holding the image signal from the CCD 1; an A/D circuit for A/D converting the signal from the signal processing circuit 2; a memory 5 for storing the output signal from the A/D circuit 3; a computing circuit 4 for calculating the amount of light emitted from a strobe section 7 on the basis of the output signal from the A/D circuit 3 or the memory 5; a central processing unit (CPU) 6 for controlling the operation of each section of the embodiment; and a timing generator (TG) 8 for generating a timing signal to drive the CCD1.

The strobe section 7 is composed of, for example, a strobe flash tube 11 made up of a Xe flashbulb, a trigger electrode 12 of the strobe flash tube 11, and a flashing control circuit 10 that controls the flashing of the strobe flash tube 11 under the control of the CPU 6.

The average person's eyes feel a flicker when light blinks. As the flashing on and off period (the frequency of blinking) gets faster, the eyes, in the end, feel no flicker. The critical frequency is known as CFF (Critical Fusion Frequency). CFF is proportional to the logarithm of the brightness of stimulus (Ferry-Porter's law). CFF, however, does not increase much when the luminance gets greater than a certain value.

It is common knowledge that the frame frequency of television screens (frames) must be larger than the CFF. Japanese televisions are set at a CFF of 60 Hz. It is known that when the frequency of a flicker is greater than 60 Hz, the average person cannot perceive the flicker.

Figure 2:
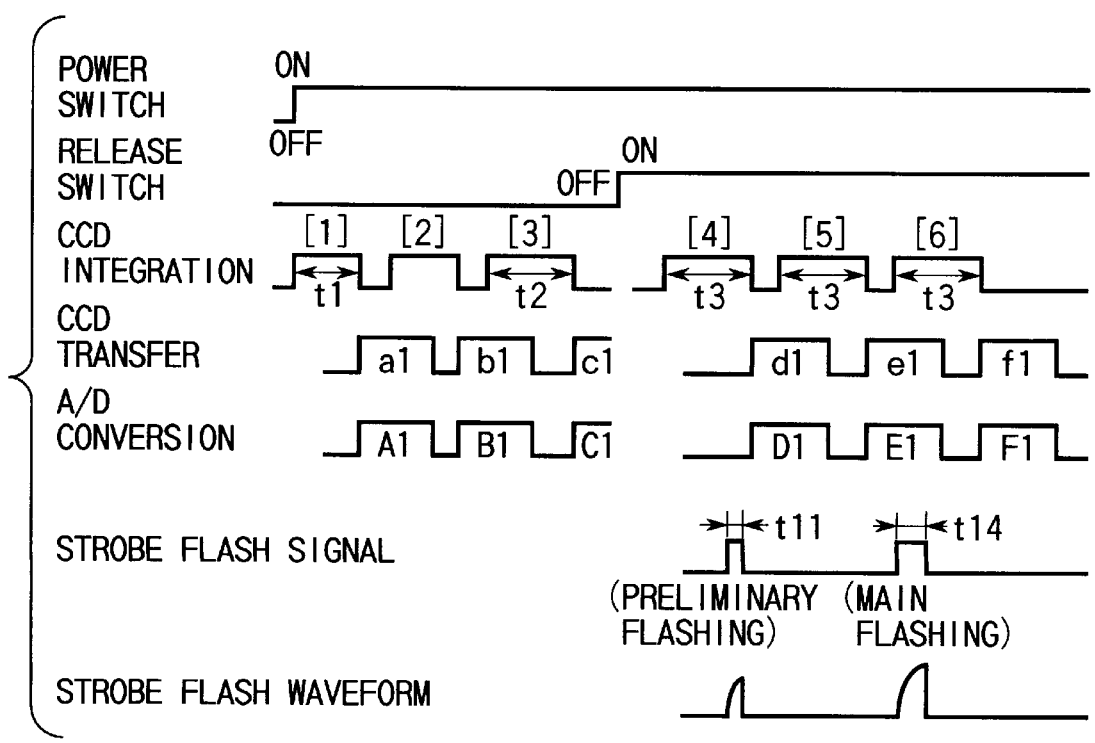
FIG. 2 is a timing chart to help explain the operation of the strobe device having the configuration of FIG. 1.
Figure 3:
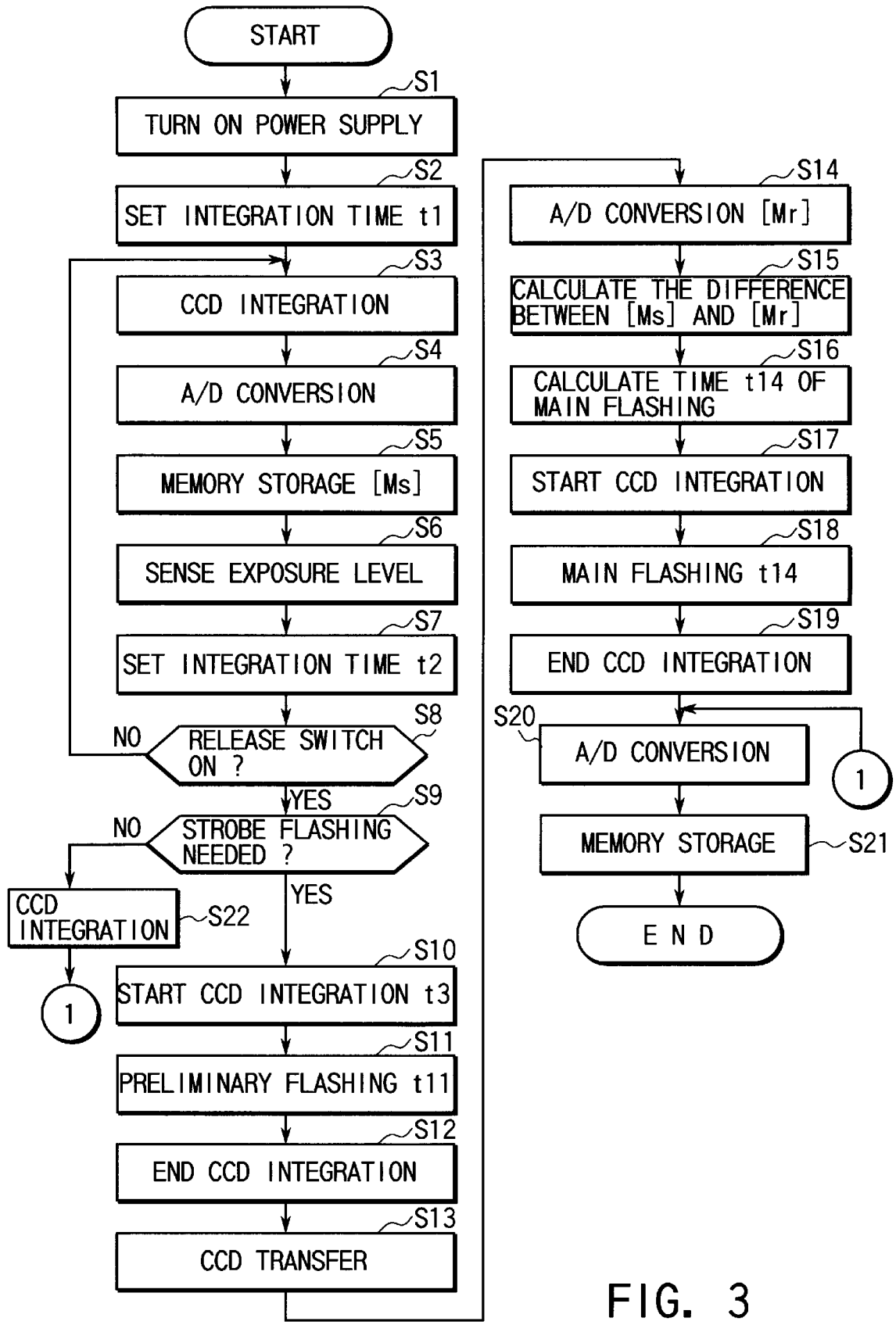
FIG. 3 is a flowchart to help explain the operation of the strobe device with the configuration of FIG. 1.

The operation of the strobe device constructed as shown in FIG. 1 will be described by reference to the timing chart of FIG. 2 and the flowchart of FIG. 3.

First, when the power supply of the camera it turned on (step S1), TG 8, before the photographing operation, sends a timing signal for driving to the CCD 1 under the control of the CPU 6. A predetermined integration time t1 is set (step S2). The CCD 1 integrates the photoelectric current for the integration time t1. In response to the transfer clock signal from the TG 8, the CCD 1 sends the output signal to the signal processing circuit 2 (step S3).

Then, the signal processing circuit 2 samples the received output signal synchronously for each pixel of the CCD 1. The sampled signal is converted into a digital signal at the A/D circuit 3 (step S4). The converted signal is stored in the memory 5 (step S5). The computing circuit 4 senses the exposure level (step S6). On the basis of the sense result, the CPU 7 makes an exposure judgment and determines the next integration time t2 of the CCD 1 (step S7).

As a result of the repetition of the above-described processing cycle, the exposure judgment based on the A/D converted value corresponding to the pixel of the output of the CCD 1 for the determined integration time and the storage value in the memory 5 are updated every CCD cycle, causing the latest information to always be stored in the memory 5.

After the repetition of such processes, when the photographer presses the release switch (not shown) (step S8), the CPU 6 judges whether or not the flashlight of the strobe device has the necessary field of vision luminance at that time, or whether or not the camera mode that permits strobe flashing is on (step S9). If the flashing of the strobe device is unnecessary or is not permitted (NO), the output from the CCD 1 will be exposed for the latest integration time obtained as described above (step S22) and control will proceed to step S20, where A/D conversion will be made and the converted value be stored in the memory 5, which will complete the process. The judgment, however, shows that strobe flashing is necessary (YES), the CPU 6 will pass control to the following sequence process.

First, an integration process for the integration time t3 of the CCD 1 necessary for strobe flashing is started (step S10). During the integration time of the CCD 1, a flash signal of a predetermined relatively short time t11 is sent to the strobe device. The flashing control circuit 10 applies a flash trigger signal to the trigger electrode 12 with respect to the flash tube 11, thereby causing the flash tube to flash during the time corresponding to the time t11 (step S11).

The photoelectric current generated by the light generated by the emitted light from the flashing and natural light both being reflected by the subject is integrated in the cycle [4] of the CCD 1 (step S12). The integrated signal is transferred in cycle [d1] (step S13). The transferred signal is A/D converted with timing D1 (step S14).

The computing circuit 4 compares the preceding output of the CCD 1 stored in the memory 5 with the A/D converted output of timing D1 on a pixel basis and calculates the difference between them (step S15).

In this case, the difference may be found uniformly over the entire screen or for part of the screen. Moreover, the screen may be divided into sub-screens and the difference be found for each sub-screen. Then, various calculations may be done according to the form of the subject by changing the weighting of the difference for each sub-screen.

The CPU 6 calculates the time t14 of the main flashing on the basis of the value of the difference and information on the A/D converted value of the steady light excluding the reflected strobe light or determines the time t14 by reference to a relevant table (step S16). The CPU 6 then causes the strobe flashing control circuit 10 to flash at time t14 in synchronization with cycle 6 of exposure sequence (steps S17, S18, S19).

The flashlight is reflected by the subject. The reflected light makes the output signal, which is converted by the A/D conversion circuit 3 (step S20). The converted signal is stored in the memory 5 as an image file (step S21).

The operation goes on as described above. By setting the preliminary flashing and the main flashing so that they may be done in the time range which is the inverse of CCF where the naked eye cannot feel a flicker, the subject will not have a sense of incongruity and feel the flashing as natural. Both of integration cycle [5] and the read operation may be omitted.

Figure 4:
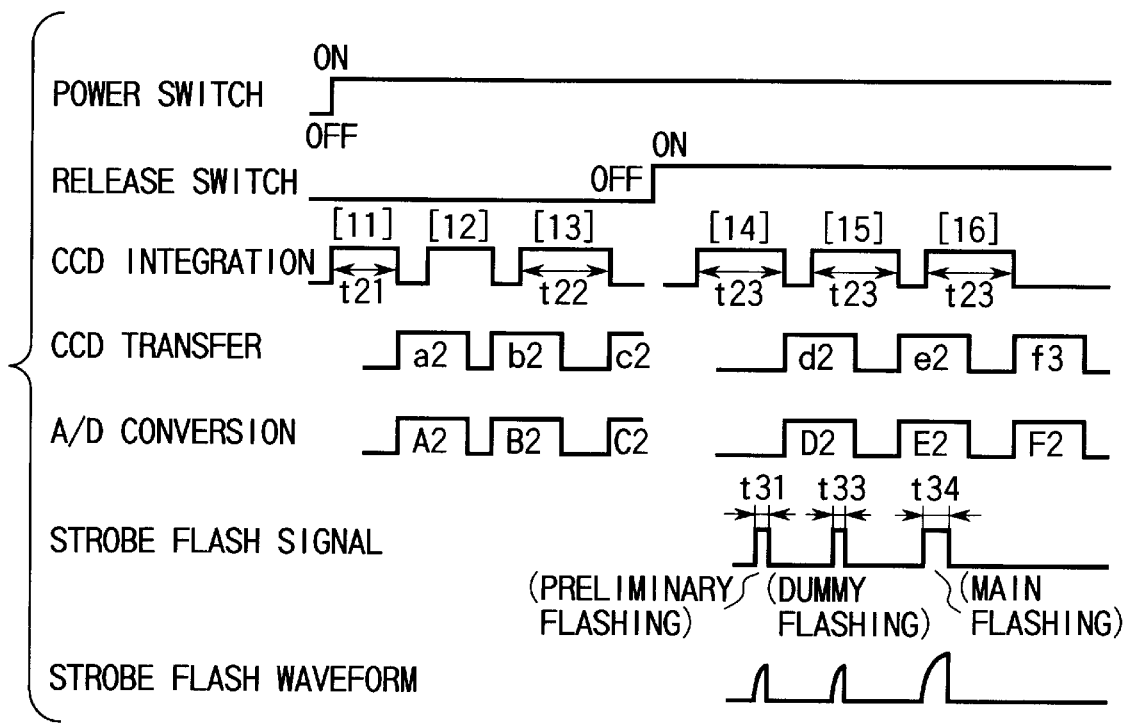
FIG. 4 is a timing chart to help explain the operation of a strobe device applied to an electronic camera according to a second embodiment of the present invention.

A strobe device applied to an electronic camera according to a second embodiment of the present invention will be described by reference to FIG. 4. The configuration of the second embodiment is equivalent to that of the first embodiment except for the operation.

An ordinary CCD 1 integration and a usual transfer and read cycle take several tens milliseconds. When the operation in the first embodiment is carried out, the interval between the preliminary flashing and the main flashing is so long in the normal CCD transfer and read cycle that the naked eye feels the flicker of the flash. The second embodiment is characterized by effecting dummy flashing to prevent a sense of flicker occurring during the interval between the preliminary flashing and the main flashing.

Because in the second embodiment, the same sequence as in the first embodiment is performed from when the release switch (not shown) is pressed until the preliminary flashing of the strobe device is effected, a detailed explanation of the sequence will not be given.

First, when preliminary flashing is done in synchronization with the cycle 14 of the CCD 1, then CCD 1 is read from in cycle 15. Thereafter, the same computing process as in the first embodiment is carried out to determine the flashing time (the amount of light) of the main flashing. During the interval between the reading and the execution of the computing process, at least one dummy flashing is done in such a period as prevents the naked eye from feeling a flicker. The dummy flashing has no effect on the integration operation 16 carried out by the CCD 1 in cycle 15. Flashing is done for the time t34 in synchronization with the end of the computing process and the next cycle of the CCD 1, thereby producing supplementary light to illuminate the subject.

Next, a strobe device applied to an electronic camera according to a third embodiment of the present invention will be explained. The configuration of the third embodiment is equivalent to that of the first embodiment except for the operation. The third embodiment improves the accuracy of exposure for the main flashing by carrying out preliminary flashing a plurality of times for the dummy flashing done in the second embodiment.

The strobe control method that determines the amount of light of the main flashing by sensing the amount of the reflected light of the preliminary flashlight has had the following problem.

For instance, to illuminate the subject at a distance of 30 cm to 3 m, a hundredfold amount-of-light adjusting range is needed, since the illuminance on the subject is inversely proportional to the square of the distance between the light source and the subject. When the distance of the subject is unknown and the amount of flashlight is excessive, the CCD output is saturated and the level sensing cannot be done, preventing the amount of light of the main flashing from being determined. To solve this problem, a preliminary flashing with the minimum amount of light must be effected once on the assumption that the subject will be at the minimum distance. If the subject is at a distance ten times the shortest distance, the minimum amount of light will be only about one-hundredth of the necessary amount of light and therefore the output of the CCD caused by the reflection of the minimum amount of light will be only about 1%. On top of that, the photoelectric current by the steady light is superposed on the output, which makes the sensing accuracy much worse, making it impossible to achieve the necessary control accuracy of the main flashing.

To solve this problem, the third embodiment enables high-accuracy amount-of-light control of the main flashing from a very short distance to a long distance.

Figure 5:
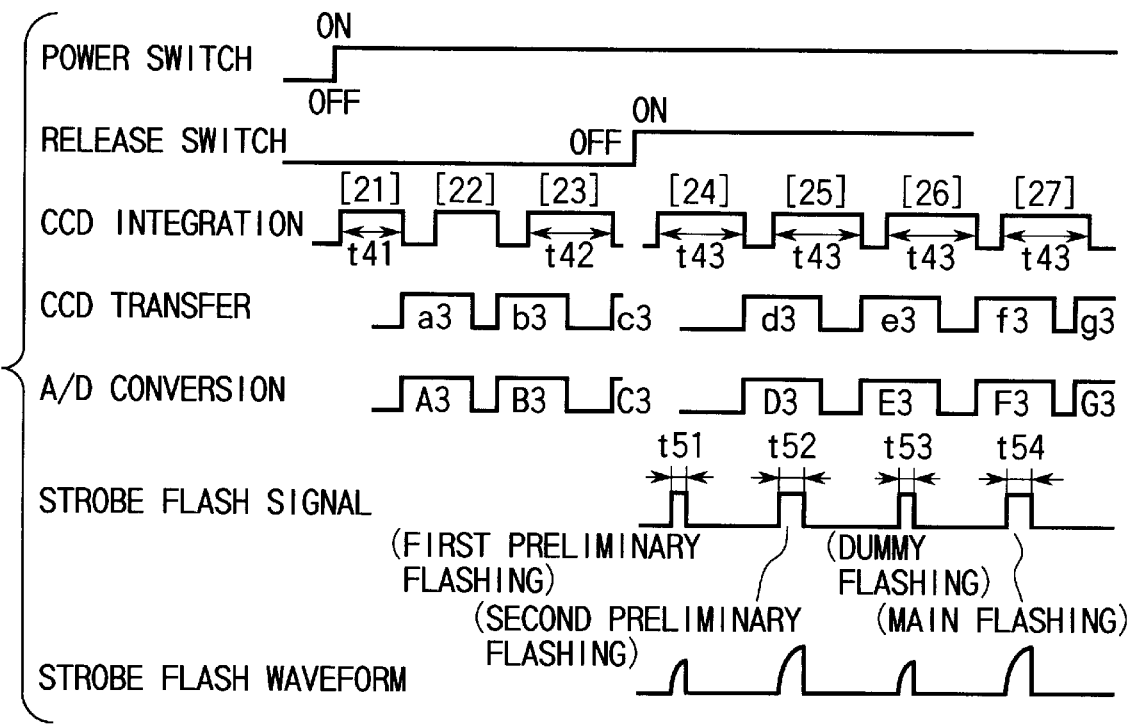
FIG. 5 is a timing chart to help explain the operation of a strobe device applied to an electronic camera according to a third embodiment of the present invention.

The third embodiment will be described by reference to the timing chart of FIG. 5.

After a first preliminary flashing has been done by the release switch being pressed, a second preliminary flashing is effected in synchronization with cycle 25 in the CCD cycle. For instance, the flashing time for each flashing is set so that the amount of light of the first preliminary flashing may correspond to $1/128$ of the total amount of flashlight in the strobe device and the amount of light of the second preliminary flashing may correspond to about $1/8$ of the total amount of light. Moreover, to increase the accuracy or the distance range of strobe photography, preliminary flashing may be done three times or more and, for instance, the amount of light of each preliminary flashing may be set at $1/256$, $1/32$, and $1/4$, respectively. By doing this, the amount of light (flashing time t54) of the main flashing can be determined accurately on the basis of the data read by D3 and E3 and A/D converted.

In the third embodiment, too, dummy flashing is inserted at such intervals as prevents the naked eye from feeling a flicker during the interval between the second preliminary flashing and the main flashing.

Figure 6:
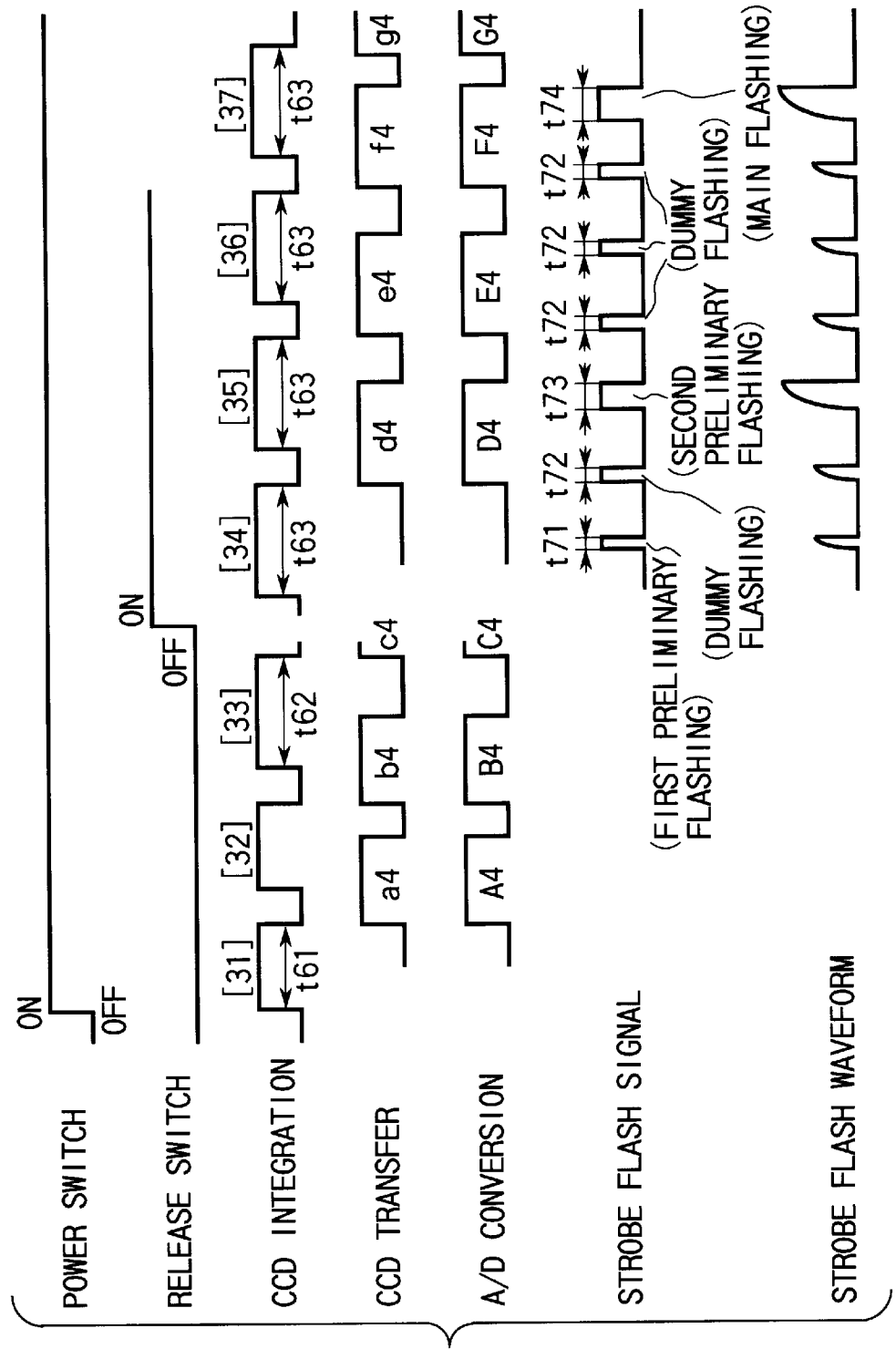
FIG. 6 is a timing chart to help explain the operation of a strobe device applied to an electronic camera according to a fourth embodiment of the present invention.

A strobe device applied to an electronic camera according to a fourth embodiment of the present invention will be explained with reference to FIG. 6.

The configuration of the fourth embodiment is equivalent to that of the third embodiment except for the operation. For instance, when the luminance of the subject is low and one CCD cycle is so long that the naked eye feels a flicker, the fourth embodiment prevents the naked eye from feeling a flicker by inserting dummy flashing between respective CCD cycles. The sequence all the way to pressing the release button is the same as in the third embodiment, so a detailed explanation of the sequence will not be given.

First, when the photographer presses the release button and the CPU judges that strobe flashing is needed for photography, a first preliminary flashing with a relatively small amount of light is effected at flashing time t71 in synchronization with the following CCD cycle. After the charges on the CCD light-receiving element at that time have been transferred, dummy flashing with a small amount of light is done at flashing time t72 with such timing as has no effect on the integration of the CCD cycle.

After the dummy flashing has ended, the CPU starts the next CCD cycle. During the integration of the CCD cycle, a second preliminary flashing with the amount of light larger than that of the first preliminary flashing is effected at flashing time t73. The output signal of the CCD including the amount of light of first the preliminary flashing is A/D converted almost simultaneously with the dummy flashing and the second preliminary flashing. The converted signal is then stored in the memory.

After the second preliminary flashing has been done, dummy flashing is done as many times as needed to prevent the flicker of flashing from when the integration cycle of the CCD has completed to when the exposure sequence for taking a picture is started. The integration output of the CCD including the amount of light of the second preliminary flashing is A/D converted almost simultaneously with the dummy flashing. The converted signal is then stored in the memory.

The CPU or computing device compares the memory data on the basis of the output value of the integration of only the steady light before any preliminary flashing is done with the memory data on the basis of the output value of the integration including information on each preliminary flashing. The CPU or computing device thereby determines the flashing time of the main flashing necessary for the optimum exposure and causes the flashing control device to effect the main flashing in synchronization with the exposure sequence for taking a picture. In this way, the flashing of the strobe device is done and the flashing time of the main flashing to obtain the amount of flashlight for more accurate exposure is determined on the basis of more than one preliminary flashing.

With the strobe device of the present invention, neither the photographer nor the subject can feel the flicker of flashing caused by the interval between the preliminary flashing and the main flashing, because the interval between the preliminary flashing and the main flashing is set at such a time as prevents the naked eye from recognizing fluctuations in the luminance.

Furthermore, the flicker of flashing is prevented by effecting flashing once or more times that has nothing to do with the setting of the amount of light of the main flashing, during the interval between the preliminary flashing and the main flashing to force the setting time to lie in the time interval that prevents the naked eye from recognizing fluctuations in the luminance, when time has elapsed so much time in setting the amount of light of the main flashing on the basis of the integration result of the imaging element after the preliminary flashing that the time interval between the preliminary flashing and the main flashing has exceeded the time that prevents the naked eye from recognizing fluctuations in the luminance.

Still furthermore, a two-dimensional imaging element usually used for photography is used as the light-receiving element for preliminary flashing to obtain the necessary information for setting the amount of light of the main flashing in taking a picture.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

What is claimed is:

1. A strobe device comprising:
    preliminary flash projecting means for effecting preliminary flashing to set the amount of light of the main flashing by projecting supplementary light on a subject for photography;
    a two-dimensional imaging element for photoelectrically converting the light reflected from the subject which is illuminated by the preliminary flashing of said preliminary flash projecting means;
    amount-of-flashlight computing means for calculating the amount of light of the main flashing projected on the subject from the output of said two-dimensional imaging element;
    flashing control means for setting the amount of light of said main flashing on the basis of the calculation result produced by said amount-of-light computing means; and
    means for setting the interval between said preliminary flashing and said main flashing at such a time as prevents the naked eye from recognizing fluctuations in the luminance existing between said preliminary flashing and said main flashing.

2. A strobe device according to claim 1, wherein when the time interval between said preliminary flashing and said main flashing has exceeded said time that prevents the naked eye from recognizing fluctuations in the luminance, said preliminary flash projecting means effects flashing once or more times that has nothing to do with the setting of the amount of light of the main flashing, during the interval between the preliminary flashing and the main flashing to force the setting time to lie in the time interval that prevents the naked eye from recognizing fluctuations in the luminance.

3. A strobe device according to claim 1, wherein the interval between said preliminary flashing and said main flashing is within a time range which is an inverse of (Critical Fusion Frequency).

4. A strobe device according to claim 1, wherein the flashing for the setting to prevent the naked eye from recognizing fluctuations in the luminance existing between said preliminary flashing and said main flashing corresponds to the period for reading the photoelectrically converted signal from said two-dimensional imaging element.

5. A strobe device according to claim 4, wherein said preliminary flashing includes more than one preliminary flashing each differing in the amount of light.

6. A strobe device according to claim 5, wherein said more than one preliminary flashing increases in the amount of flashlight as the number of repetitions of the preliminary flashing increases.

7. A strobe device according to claim 6, wherein said amount of flashlight increases in steps of the n-th power of 2 (n is an integer) times.

8. A strobe device according to claim 5, wherein of said more than one preliminary flashing, the one suitable to obtain a proper image signal is chosen for the main flashing.

9. A strobe device according to claim 2, wherein said flashing that prevents the naked eye from recognizing fluctuations in the luminance existing between said preliminary flashing and said main flashing, is smaller in the amount of flashlight than said preliminary flashing.

10. A strobe device comprising:
    preliminary flash projecting means for preliminarily flashing to set the amount of light of the main flashing, by projecting supplementary flashlight on a subject for photography;
    a two-dimensional imaging element for photoelectrically converting the light reflected from the subject which is illuminated by the preliminary flashing of said preliminary flash projecting means;
    amount-of-flashlight computing means for calculating the amount of light of the main flashing to be projected on the subject on the basis of the difference between a first output produced by said two-dimensional imaging element with preliminary flashing and a second output produced by said two-dimensional imaging element without preliminary flashing; and
    flashing control means for setting the amount of light of the main flashing on the basis of the calculation result from said amount-of-light computing means.

11. In a photographing method using strobe light as supplementary light to compensate for the shortage of steady light, a strobe flashing method for electronic cameras, comprising the steps of:
    effecting at least more than one preliminary flashing to determine the amount of light of the main flashing in a period of time that prevents the naked eye from feeling a flicker due to an afterimage effect, before the main flashing of the strobe light;
    causing an imaging element for taking a picture of an image to integrate the amount of light for the period including said preliminary flashing and to output the result; and determining the amount of light of the main flashing on the basis of the output result.

12. A strobe flashing method according to claim 11, further comprising the step of determining the amount of light of the main flashing on the basis of the relative relationship between a first integration result obtained by integrating only said steady light and a second integration result obtained by integrating the amount of light in the period including said preliminary flashing.

13. A strobe flashing method according to claim 11, further comprising the step of, when the interval between said preliminary flashing and said main flashing is longer than an inverse of CFF (Critical Fusion Frequency), effecting at least one dummy flashing in the interval to make the interval between one flashing and another smaller than CFF.

14. A strobe flashing method according to claim 11, further comprising the steps of:
- effecting said preliminary flashing a plurality of times, each differing in the amount of light; and
- setting a flashing time to give the amount of light of the main flashing on the basis of the relative relationship between the output results of the imaging element corresponding to each flashing and the output result of the steady light only.

\* \* \* \* \*